United States Patent [19]
Wood, Jr. et al.

[11] 3,859,425

[45] Jan. 7, 1975

[54] PROCESS FOR RECOVERY OF SULFUR VALUES

[75] Inventors: Arthur S. M. Wood, Jr., Mobile, Ala.; Kirk Vail Darragh, Yorktown, N.Y.

[73] Assignee: Stauffer Chemical Company, Westport, Conn.

[22] Filed: Nov. 27, 1972

[21] Appl. No.: 309,856

[52] U.S. Cl................. 423/567, 423/578, 260/664
[51] Int. Cl............................................ C01b 17/04
[58] Field of Search........... 423/567, 570; 23/267 S; 260/664

[56] References Cited
UNITED STATES PATENTS
| | | | |
|---|---|---|---|
| 166,279 | 8/1875 | Johnson | 23/267 S |
| 2,088,190 | 7/1937 | Dupont | 423/578 |
| 3,081,359 | 3/1963 | Saller et al. | 260/669 |
| 3,273,966 | 9/1966 | Bowling et al. | 423/578 |
| 3,371,999 | 3/1968 | Skrzec | 423/664 |
| 3,768,988 | 10/1973 | Meyers | 423/567 |

*Primary Examiner*—G. O. Peters
*Attorney, Agent, or Firm*—Daniel S. Ortiz

[57] ABSTRACT

The invention is a process for recovering sulfur values from impure sulfur containing iron and sulfur chloride impurities in which a sulfur-sulfur chloride mixture is dissolved in a solvent, the solution is filtered to remove undissolved material, the sulfur is crystallized and then separated from the mother liquor.

11 Claims, No Drawings

PROCESS FOR RECOVERY OF SULFUR VALUES

BACKGROUND OF THE INVENTION

In a process for preparing carbon tetrachloride by the reaction of carbon disulfide with chlorine, a mixture containing sulfur and sulfur chloride is formed as a by-product. The sulfur-sulfur chloride mixture usually contains small amounts of iron, carbon disulfide and carbon tetrachloride.

The process for the chlorination of carbon disulfide to carbon tetrachloride is believed to proceed in accordance with the following chemical reaction scheme:

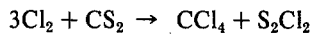

$$3Cl_2 + CS_2 \rightarrow CCl_4 + S_2Cl_2 \qquad (1)$$

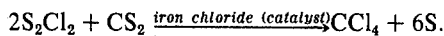

$$2S_2Cl_2 + CS_2 \xrightarrow{iron\ chloride\ (catalyst)} CCl_4 + 6S. \qquad (2)$$

As can be seen from the above equations, sulfur monochloride is formed as one of the products of the direct chlorination of carbon disulfide. The reaction between sulfur monochloride and carbon disulfide is usually not complete and the sulfur residues contain small quantities of carbon disulfide, sulfur chloride and carbon tetrachloride along with the iron chloride catalyst. The major portion of the unreacted carbon disulfide and the product carbon tetrachloride can be separated from the sulfur-sulfur chloride mixture by distillation. The resulting sulfur-sulfur chloride mixture usually contains less than about 10% by weight sulfur chloride and minor amounts of carbon bisulfide, carbon tetrachloride, and iron chloride. Due to the presence of sulfur chlorides and iron, the by-product or crude sulfur is unsatisfactory in many uses. The process of the invention is an efficient method for reducing the amount of iron and chlorides present in the sulfur to relatively low levels.

U.S. pat. No. 2,336,688 discloses a method for removing sulfur chloride impurities from sulfur which comprises contacting the crude molten sulfur with superheated steam to react the sulfur chlorides to sulfur dioxide, hydrogen chloride and sulfur. This method is effective for removing the sulfur chloride impurities but leaves behind the residue of the iron catalyst and generally does not reduce the sulfur chloride concentrations to an acceptable low level without extensive or lengthy periods of contacting the molten sulfur with the super-heated steam. The process has the disadvantage that $SO_2$ and HCl are formed during the reaction. The mixture of HCl and $SO_2$ has little commercial potential and is usually vented to the atmosphere or collected, neutralized and disposed of as a liquid. In either case the reaction products present an environmental pollution problem; the solution of which greatly increases the cost of operating the process.

A rapid process for removing chloride impurities from crude sulfur is disclosed in U.S. Pat. No. 3,371,999. The patent discloses that the sulfur chloride impurities can be removed from the crude sulfur by contacting the crude sulfur in a molten state with an aqueous liquid at an elevated pressure and temperature. The patent discloses that the reaction is rapid and that sulfur containing a low concentration of chlorides can be obtained. The reaction apparently proceeds through the rapid reaction of the chlorides with the aqueous medium. This method is effective in reducing the chloride impurities contained in the sulfur to relatively low levels. However, the process produces an aqueous effluent containing halides and various sulfur compounds formed by the reaction of the sulfur halides with the aqueous medium at the elevated temperature. Disposal of large quantities of the liquid effluent present problems for operation of the process.

In view of the disadvantages inherent in the disposal of the by-product streams generated by the prior art processes for removal of iron and chlorides from crude sulfur mixtures, the processes have not proved satisfactory in commercial operation.

It is an object of the present invention to provide an efficient method for separating chloride and iron impurities from crude sulfur mixtures which are by-products of the preparation of carbon tetrachloride from carbon disulfide which can be carried out in short time periods and produce only a minimum of effluents.

BRIEF SUMMARY OF THE INVENTION

According to the present invention the concentration of iron and chloride impurities in crude sulfur can be reduced by first forming a solution of the crude sulfur mixture in a suitable solvent, filtering the mixture to remove any undissolved material, crystallizing the sulfur from the solution and separating the crystallized sulfur from the mother liquor. The crystallized sulfur can be further treated by melting and contact with an inert gas such as superheated steam or nitrogen to remove remaining solvent and further reduce chlorides in the product. The waste streams produced by the process are small and can be readily accommodated.

DETAILED DESCRIPTION OF THE INVENTION

The crude sulfur containing chloride impurities is first dissolved in a suitable solvent for sulfur. A suitable solvent is a solvent in which sulfur is soluble and which does not react with the impurities to form products which cannot be recycled to the process from which the sulfur-sulfur chloride mixture was withdrawn. The preferred solvents are carbon bisulfide, sulfur monochloride, sulfur dichloride or mixtures thereof. The preferred solvents are readily available where the crude sulfur is produced and when separated from the sulfur crystals can be returned to the carbon tetrachloride process to utilize the recovered sulfur chlorides thus eliminating a by-product disposal problem.

To aid in crystallizing the sulfur, it is preferred that the minimum amount of solvent required to dissolve the crude sulfur and provide a fluid mixture be utilized. The sulfur can be dissolved in the solvent at room temperature or at elevated temperatures. The sulfur concentration in the solvent should preferably be as high as possible to facilitate crystallization of the sulfur from the solution.

The solution of the crude sulfur containing iron and chloride impurities is filtered to remove any insoluble material in the mixture. Since the iron impurities are relatively insoluble in the solution, a substantial portion of the iron impurities are removed from the mixture during the filtration step. The form of the iron impurities in the mixture is uncertain. The term iron is used herein to denote iron or iron compounds which can be in the mixture. Known means of separating small solid particles from a liquid stream can be utilized to accomplish the separation. A precoated filter has been found to be particularly effective to accomplish the separation. The small amount of solids separated from the solution must be disposed of as waste from the process.

The sulfur is crystallized or precipitated from the filtered solution. Crystallization can be accomplished by several methods, such as: cooling the solution to a temperature below the saturation temperature for the concentration of sulfur in the solution; vaporizing a portion of the solvent to concentrate the solution and crystallize the sulfur; contacting the solution with an inert gas to cool or concentrate the solution; through the application of a vacuum to concentrate and cool the solution to crystallize the sulfur; or adding a liquid to the solution which is miscible with the solution to lower the solubility of sulfur in the solution to crystallize the sulfur. The method utilized to crystallize sulfur from the solution can be adapted to conform to the available equipment and economics of a particular operation.

The addition of a liquid, which is compatible with the solvent and which has a low solubility for sulfur, to the sulfur containing solution, changes the solubility of sulfur in the mixture and causes the sulfur to precipitate from the mixture. Since carbon tetrachloride is a product of the process in which the crude sulfur is produced and has a relatively low solubility for sulfur, it is the preferred liquid for addition to the solution. Carbon tetrachloride can also be used to wash entrained mother liquor from the sulfur crystals.

The slurry of crystallized sulfur is then passed to a separation zone where the sulfur is separated from the mother liquor. Known means for separation of solids from liquids can be utilized in the separation zone. Separating means such as centrifuges, filters, liquid cyclones and the like are suitable. Settling tanks or liquid cyclones can be used in conjunction with a filter or centrifuge to separate the mother liquor from the crystallized sulfur.

Since the mother liquor wets or is entrained with the sulfur and contains sulfur chloride, it is usually desirable to wash the sulfur with a liquid compatible with the solvent to remove any mother liquor which is entrained with or is wetting the surfaces of the sulfur crystals. Carbon disulfide and carbon tetrachloride are preferred solvents since they can be returned to the process. Under certain circumstances water can be used to remove the small amounts of sulfur chlorides which remain with the sulfur crystals.

The mother liquor which contains sulfur chloride and dissolved sulfur can be returned to the process and the sulfur chloride reacted to form carbon tetrachloride. The sulfur chloride values which were contained in the crude sulfur are thereby recovered and a disposal problem obviated.

The recovered sulfur can be further purified by contacting the sulfur with an inert gas to strip off any solvent contained in the crystals or the sulfur can be melted and contacted in a molten state with superheated steam, hot water, or an inert gas to remove the last traces of sulfur chlorides or entrained solvent. Sulfur can be recovered from the stripping zone as a solid or a liquid and can be utilized as a source of sulfur in most processes which utilize sulfur.

The following examples are presented to illustrate the process of the present invention. All percentages shown are by weight unless otherwise noted.

EXAMPLE 1

Crude sulfur containing 7.27% $S_2Cl_2$ is dissolved in a slight excess of carbon disulfide at room temperature. An insoluble portion is removed by filtration through glass wool. Sulfur is crystallized from the solution by a combination of evaporation and cooling to a final temperature between 35° and 45°F. The liquid phase is decanted from the sulfur crystals after 60 to 70% of the original sulfur is crystallized. The crystals are washed with carbon tetrachloride and air dried. The purified sulfur contained 127 parts per million $S_2Cl_2$ by the total acid method.

In the total acid method a weighed sample of sulfur is dissolved in carbon disulfide, the solution is then mixed for 10 to 20 minutes with an excess of a standard solution of NaOH, the excess NaOH is back titrated with a standard HCl solution to a methyl red end point. The precent $Sl_2Cl_2$ is determined by the following equation:

[(Ml. of NaOH×Normality) −(Ml. of HCl×Normality)]× .04501×100=%$S_2Cl_2$/Weight of Sample (grams)

EXAMPLE 2

50 grams of the recovered sulfur from Example 1 containing 127 parts per million $S_2Cl_2$ by the total acid method are melted and air is sparged through the molten liquid at 1 cubic foot per minute for 6 minutes. The $S_2Cl_2$ concentration as determined by the total acid method dropped from 127 parts per million to 91 parts per million.

EXAMPLE 3

To 20 grams of a crude sulfur mixture containing about 6% $S_2Cl_2$ and 720 parts per million iron, by weight, from a process for preparing carbon tetrachloride by the chlorination of carbon bisulfide are added 12 grams of $S_2Cl_2$. The mixture is heated until the bulk of the solids are dissolved and a substantially homogenous solution is formed. The mixture is filtered to remove insoluble residues. On cooling to room temperature, sulfur precipitates from the filtrate. The sulfur is filtered from the liquid and is washed with 30 ml. of carbon tetrachloride. The washed sulfur is air dried and weights 11.2 grams. The sulfur analyzes 0.8% $S_2Cl_2$ and 10 parts per million iron.

EXAMPLE 4

To the filtrate from Example 3 are added 30 ml. of carbon tetrachloride. Sulfur precipitates from the filtrate. The precipitated sulfur is filtered from the liquid. One gram of sulfur is recovered. The sample analyzes 0.04% $S_2Cl_2$ and 30 parts per million iron by weight.

EXAMPLE 5

One-third of the sulfur product of Example 3 is placed on a fritted glass funnel and 10 ml. of carbon tetrachloride are added to the solid. After standing for 10 minutes, the carbon tetrachloride is removed by vacuum filtration and the sulfur crystals air dried. The sample analyzes 0.03% $S_2Cl_2$.

In Examples 3, 4 and 5 the sulfur chloride in the product was determined by gas chromatography. The iron was determined by atomic absorption spectroscopy and is reported as iron by weight.

The examples clearly indicate that the amount of iron impurities in the crude sulfur can be substantially reduced by the process of the present invention. The major portion of the iron impurities are separated from the crude sulfur by filtration or remain dissolved in the mother liquor which is separated from the crystallized sulfur.

The process is advantageous in that carbon disulfide, sulfur dichloride and carbon tetrachloride which can be used to recover the sulfur can be returned to the process for preparing carbon tetrachloride by the chlorination of carbon bisulfide obviating waste disposal problems.

What is claimed is:

1. In a process for preparing carbon tetrachloride by the reaction of carbon disulfide and chlorine wherein a crude mixture of sulfur with sulfur chloride and iron is produced and the sulfur is separated from the sulfur chloride and iron, the improvement which comprises:
   a. forming a solution by dissolving the crude mixture in a solvent selected from the group consisting of carbon disulfide, sulfur monochloride, sulfur dichloride and mixtures thereof;
   b. separating undissolved solids from the solution;
   c. precipitating sulfur from the solution to form precipitated sulfur and a mother liquor;
   d. separating the precipitated sulfur from the mother liquor whereby the concentration of sulfur chloride and iron in the sulfur is reduced.

2. The process of claim 1 wherein the sulfur is precipitated from the solution which has been separated from the undissolved material by vaporizing a portion of the solvent from the solution.

3. The process of claim 1 wherein the crystals separated from the mother liquor are washed with a solvent for sulfur chloride.

4. The process of claim 1 wherein the crude sulfur mixture is dissolved in the suitable solvent at an elevated temperature and the sulfur crystallized from the solution at a lower temperature.

5. The process of claim 1 wherein the mother liquor is returned to the process for preparing carbon tetrachloride by the chlorination of carbon disulfide.

6. The process of claim 2 wherein the mother liquor is returned to the process for preparing carbon tetrachloride by the chlorination of carbon disulfide.

7. The process of claim 1 wherein the crude mixture is derived from a process for preparing carbon tetrachloride by the chlorination of carbon disulfide, wherein the solvent is carbon disulfide, the sulfur crystals separated from the mother liquor are washed with carbon tetrachloride and the filtrate and washing solvent are returned to the process for preparing carbon tetrachloride by the chlorination of carbon disulfide.

8. The process of claim 2 wherein the crystallized sulfur separated from the mother liquor is washed with carbon tetrachloride and the carbon tetrachloride is added to the mother liquor to precipitate additional sulfur crystals.

9. The process of claim 1 wherein the solution which has been separated from the undissolved material is admixed with carbon tetrachloride to precipitate sulfur.

10. The process of claim 1 wherein the precipitated sulfur which has been separated from the mother liquor is contacted with hot water.

11. The process of claim 2 wherein the precipitated sulfur which has been separated from the mother liquor is contacted with hot water.

* * * * *